United States Patent
Minakata et al.

(10) Patent No.: US 7,672,501 B2
(45) Date of Patent: Mar. 2, 2010

(54) SUBSTRATE INSPECTION SYSTEM INCLUDING A VISUAL INSPECTION DEVICE FOR INSPECTION BY IMAGE PROCESSING

(75) Inventors: Taku Minakata, Ayabe (JP); Yoshiki Fujii, Kyoto (JP)

(73) Assignee: OMRON Corporation, Kyoto (JP)

( * ) Notice: Subject to any disclaimer, the term of this patent is extended or adjusted under 35 U.S.C. 154(b) by 845 days.

(21) Appl. No.: 11/517,651

(22) Filed: Sep. 8, 2006

(65) Prior Publication Data

US 2007/0058853 A1    Mar. 15, 2007

(30) Foreign Application Priority Data

Sep. 14, 2005   (JP)   ............... 2005-266364

(51) Int. Cl.
G06K 9/00    (2006.01)
G01N 21/00   (2006.01)

(52) U.S. Cl. .................................. 382/141; 356/237.4

(58) Field of Classification Search ................. 382/141
See application file for complete search history.

(56) References Cited

U.S. PATENT DOCUMENTS

| | | | |
|---|---|---|---|
| 6,879,392 B2 * | 4/2005 | Sakai et al. | 356/237.4 |
| 2004/0126003 A1 * | 7/2004 | Isomura et al. | 382/141 |
| 2004/0175030 A1 * | 9/2004 | Prince | 382/150 |
| 2005/0117794 A1 * | 6/2005 | Visser et al. | 382/141 |
| 2005/0147287 A1 * | 7/2005 | Sakai et al. | 382/141 |

FOREIGN PATENT DOCUMENTS

| | | |
|---|---|---|
| JP | 08-340199 | 12/1996 |
| JP | 2004-361145 | 12/2004 |

OTHER PUBLICATIONS

JP patent application No. 2005-266364, Examination Report mailed Mar. 7, 2009.

\* cited by examiner

*Primary Examiner*—Bhavesh M Mehta
*Assistant Examiner*—David P Rashid
(74) *Attorney, Agent, or Firm*—Weaver Austin Villeneuve & Sampson LLP (57) ABSTRACT

A substrate inspection system is formed with an inspection device associated with a reflow process at the end of a series of production processes for substrates, image collectors each associated with a different one of the production processes upstream to the reflow process and an image display device for receiving images from the inspection device and the image collector and displaying the received images. The inspection device inspects a specified number of substrates to obtain measured values and calculates a margin for each component with respect to a specified reference value and transmits to the image collectors and the image display device the component code of the component with a small margin value. The image collectors save the image corresponding to the component code from the inspection device. The image display device receives images of the component corresponding to the component code from the inspection device and the image collectors and display images of the same component and the same substrate at each process.

3 Claims, 8 Drawing Sheets

SUBSTRATE INSPECTION SYSTEM INCLUDING A VISUAL INSPECTION DEVICE FOR INSPECTION BY IMAGE PROCESSING

This application claims priority on Japanese Patent Application 2005-266364 filed Sep. 14, 2005.

BACKGROUND OF THE INVENTION

This invention relates to a substrate inspection system which provides a visual inspection device to the last or an intermediate one of a plurality of processes that are sequentially carried out for the production of component-mounting substrates for inspecting the substrate by image processing after the corresponding process has been carried out.

Component-mounting substrates (hereinafter referred to simply as substrates) are generally produced by a method including a process of printing a cream solder on a printed circuit board by means of a solder printer using a silk screen method (hereinafter referred to as the solder printing process), a process of using a mounter to mount components onto this substrate with the cream solder printed thereon (hereinafter referred to as the component mounting process) and a process of soldering these mounted components to the substrate by carrying the component-mounted substrate into a reflow oven and heating it (hereinafter referred to as the reflow process).

On a production line for substrates adapted to carry out this series of processes, it is preferable to provide a visual inspection device to each of the processes for carrying out an inspection by using an image processing method on the substrate on which the corresponding process has been carried out.

On the premise of carrying out an inspection after each of the production processes as explained above, the assignee of this invention has earlier developed a system having a data processor with a computer as its main component connected to the inspection device associated with each process. As described in Japanese Patent Publication Tokkai 2004-361145, this system is formed such that each inspection device transmits the image used for its inspection to the data processor and that the data processor displays the images of the same portion of the same substrate after the processes together on a same image screen. Such a system is capable of comparing the images of the substrate after the different processes regarding a portion with a defect, determining the process in which the abnormality causing the defect has occurred and carrying out an analysis for identifying the cause of the defect from the result of such determination. Thus, imperfections in the production line can be determined quickly and accurately.

If a large number of substrates are produced by this production line and parts of the devices used in the processes become worn, the quality of the produced substrates may become adversely affected. If the mask of the printer used in the solder printing process becomes clogged, for example, the area of the printed part corresponding to the clogged portion may become smaller or deformed. If the force of the suction pad on the mounter becomes weaker, as another example, the component mounted by such a pad may fail to be mounted correctly and become displaced.

Such adverse effects on the quality of the produced substrate due to worn-out conditions of device parts are likely to occur continuously. Moreover, the lowering of quality of this type tends to progress with time, finally reaching the level of being a defect.

If an inspection device is provided to each of the processes, the lowering of the product quality and its causes can be detected relatively easily by making judgments by providing these inspection devices not only with reference values for judging a defect but also with reference values for determining the degree of lowered product quality. If a system described in aforementioned Japanese Patent Publication is introduced, furthermore, the cause of lowered product quality can be accurately determined because the images of substrates earlier inspected can be individually compared for each process.

A user without a sufficient capital, however, may opt to provide an inspection device only for the reflow process at the end of the line, or at most for the component mounting process and the reflow process. With such a system, it may be possible to detect the existence of a portion with lowered quality but it is difficult to correctly identify its cause.

Consider a situation where an inspection device is provided only to the reflow process. A component which is somewhat displaced may be detected by such an inspection device but it is difficult to determine whether this displacement was caused at the time of mounting components or during the reflow process.

SUMMARY OF THE INVENTION

It is therefore an object of this invention in view of the problem described above to make it possible to easily determine the portion of a substrate with lowered quality as well as its cause even if the process at which inspection is carried out is limited.

A substrate inspection system according to this invention is comprised of an inspection device associated with one (but other than the first) of a plurality of production processes that are carried out sequentially for producing substrates, one or more image collectors each associated with a different one of these production processes upstream to the production process with which the inspection device is associated and adapted to communicate with the inspection device, and an image display device for receiving images from the inspection device and the image collectors and displaying the received images.

The aforementioned inspection device comprises image taking means for taking an image of a target substrate of inspection, inspecting means for using an image taken by the image taking means for each of target portions on the target substrate to carry out a specified measurement process and judging each target portion by comparing a measured value obtained by the specified measurement process with a specified reference value, selecting means for obtaining, when a plurality of substrates of a same kind have been processed by the image taking means and the inspecting means, margin of the measured value with respect to the reference value for each of the target portions for the plurality of substrates and selecting a target portion for analysis based on the margin, and transmitting means for transmitting identification data indicating the target portion for analysis selected by the selecting means to the image collector and to the image display device. The aforementioned inspecting means, selecting means and transmitting means may each comprise a computer having a program installed for the execution of the process to be carried out.

The aforementioned image collector comprises another image taking means for taking images of substrates after the production process with which the image collector is associated has been carried out thereon, and image saving means for extracting, in response to the identification data received from the inspection device, an image portion corresponding to the target portion indicated by the identification data out of the images generated by the image taking means and saving the extracted image. The aforementioned extracted image portion is preferably saved in a memory provided to itself or an externally provided image saving means, comprising a non-volatile device. Such an externally provided image saving means may include a computer adapted to carry out read and write for the image storing memory. It may be provided to the same production process as the image collector or to a different process, or may be set at a position not belonging to any of the processes (such as at the position of the aforementioned image display device). The aforementioned image saving means may comprise a computer having a program installed for executing the three kinds of processes described above. If the images are saved externally, the image saving means may be formed as means for transmitting the images to be saves.

The aforementioned image display device serves to receive from the inspection device an image portion of the target portion selected as the target portion for analysis based on the identification data and generated when a specified substrate was being inspected, and to receive image portion of same target portion as the target portion of which an image was transmitted from the inspection device for the specified substrate and to display both received image portions in such a way that they can be mutually compared.

It is preferable to have a (wired or wireless) network between the aforementioned inspection device, image collectors and image display device and to provide each of these devices with an interface circuit for communication with the other devices through this network. The inspection device and the image collectors may be adapted to transmit the images of the target portions corresponding to a plurality of substrates all at once.

With a system thus structured, the inspection device serves to receive substrates of a same kind sequentially and carried out image taking and inspection processes. It is preferable to treat the portions affected not only in the process where the device is set but also in the earlier processes as the target of inspection. After a specified number of substrates have been processed, those with a relatively small margin of the measured value with respect to the reference value for the judgment are selected as target portion for inspection, and the identification data indicative of these target portions are transmitted to the image collectors and the image display device.

In the process described above, the difference between the measured value and the reference value may be obtained for each substrate and for each target portion and the sum of these differences or the average value may be obtained as the margin for each target portion. For the selection of target portions for inspection, a specified number of target portions may be selected sequentially from those with the smallest margins but this does not limit the invention. All target portions with the margin less than a specified threshold value may be selected. Although it is preferable in the case of the inspection device to save the images of all target portions over a specified period of time, images of only the portions selected by the selecting means and those judged to be defective may be saved.

It is preferable that the image collectors obtain the image of a substrate whenever it comes to be supplied and save the image obtained by its image taking means for a specified length of time. The image saving means can select the image of the aforementioned target portion of inspection from the image past this specified length of time, based on the identification data from the inspection device, and erase all images except for this selected image. It may be adapted to select and store the image of the target portion for inspection from the image of the substrate newly taken during a specified length of time from when the identification data are received.

The inspection device may be adapted to transmit not only identification data for identify a target portion for inspection but also identification data of the substrate used for selecting the target portion such that the image collectors serve to save images of target portions of only the substrates corresponding to these substrate identification data.

The image display device may be adapted, for example, to receive the image of a target portion for inspection from the inspection device and the image collectors by transmitting to them a request command containing the aforementioned identification data. In this case, images of all target components for inspection may be received from the inspection device and the image collectors and the images from these devices may be displayed for each specified portion of specified substrate, or an operation for specifying a specified target may be received and the transmission of only the images corresponding to that specified object may be received and displayed.

In either case, images from the devices corresponding to the same portion of the same substrate can be displayed on the same screen, but the invention is not limited to such an embodiment. These images may be displayed on individually different screens on the display device. In such a case, it is preferable to make the displays such that the displayed images can be mutually compared.

With a system thus structured, it becomes possible to first detect a portion of a substrate with a deteriorated quality by means of the inspection device on the basis of the margin value with respect to the reference value obtained for the inspection and to thereafter display the images of that portion after each of the production processes. If the image collectors are adapted to take the image of each substrate that is supplied, to temporarily save the generated images, to select out of these temporarily saved images, when identification data are received from the inspection device, the image that corresponds to the received identification data and to formally save the corresponding image, the image display device can obtain images of a target component actually judged to have a small margin value after each of the production processes is carried out. Thus, the cause of lowering product quality can be analyzed based on the display of these images. If images corresponding to the aforementioned identification data are extracted and saved from the image generated newly after the identification data are received, it becomes possible to check, after the cause of lowering product quality has been removed, if the measure taken was appropriate or not.

According to a preferred embodiment of the substrate inspection system of this invention, the plurality of production processes include a solder printing process, a component mounting process and a reflow process, the inspection device being associated with the reflow process and the image collectors each being associated with the component mounting process. The inspecting means of the inspection device serves to inspect for each target component on a target substrate soldered condition thereof and displacement thereof with respect to a land, and the selecting means calculates margin of the displacement with respect to the reference value.

If the inspection device of a system thus structured detects a component with a small margin value regarding displacement with respect to a land, an image of this component after the component mounting process and another image of this component after the reflow process can be compared. Thus, if the image collector associated with the component mounting process is adapted not only to temporarily save the image of the supplied substrate but also to extract the image of the component corresponding to the identification data transmitted from the inspection device and to formally save this image, it becomes possible to compare, regarding the substrate used for the detection of the component with the small margin value, the image of this component with the small margin value after the component mounting process and that after the reflow process and hence to judge whether the cause of a positional displacement of the component was in the component mounting process or the reflow process.

According to a further preferable embodiment of the invention, the selecting means is adapted, if another component of the same kind as that selected as the target portion is mounted to the substrate, to also select the other component as target of analysis. In the above, it is preferable to interpret "the same kind" not necessarily as meaning components having the completely same functions but those having about the same size or shape. Components having about the same size or shape are frequently mounted by using the same suction head. If the suction power of the suction head becomes weaker and a certain component experiences a positional displacement, there is a high possibility that other components of the same type will experience a similar positional displacement. Thus, it is preferable that all components that are mounted by using the same pad be made a target of analysis.

It goes without saying that displacement value is not the only object regarding which margin may be obtained. Margin may be obtained regarding a measured value for the inspection of the soldered condition such as the fillet area. In this case, since the image display device can display an image of a portion where a soldering defect is likely to occur, it becomes possible to analyze where its cause is to be found.

The inspection device need not be for the reflow process at the end but may be provided to the component mounting process, an image collector being provided to the solder printing process. In such a case, the inspection device at the component mounting process may be used for carrying out measurements not only for the inspection of the mounted condition of a component but also for the inspection of the condition of the printed solder (such as the measurement of the size of the printed area), such that a target portion for inspection (such as a land) may be selected according to the margin of the measured value with respect to a reference value. Thus, if there is a deterioration in the quality of printed solder at any specified land on a substrate, since images of such a land may be displayed for both at the solder printing and component mounting processes such that they can be compared, the user can compare these displayed images to judge in which of the processes the cause of the deterioration of the quality of printing is to be found.

In summary, this invention makes it possible not only to detect a component portion of which the quality has deteriorated because of the lowered quality of production devices for substrates, but also to allow the user to understand its cause and also whether this cause has been eliminated or not, although not all of the production processes are provided with an inspection device, because images of such portion at the process where the inspection was carried out as well as at an earlier process can be displayed such that they can be compared to each other.

DETAILED DESCRIPTION OF THE INVENTION

Figure 1:
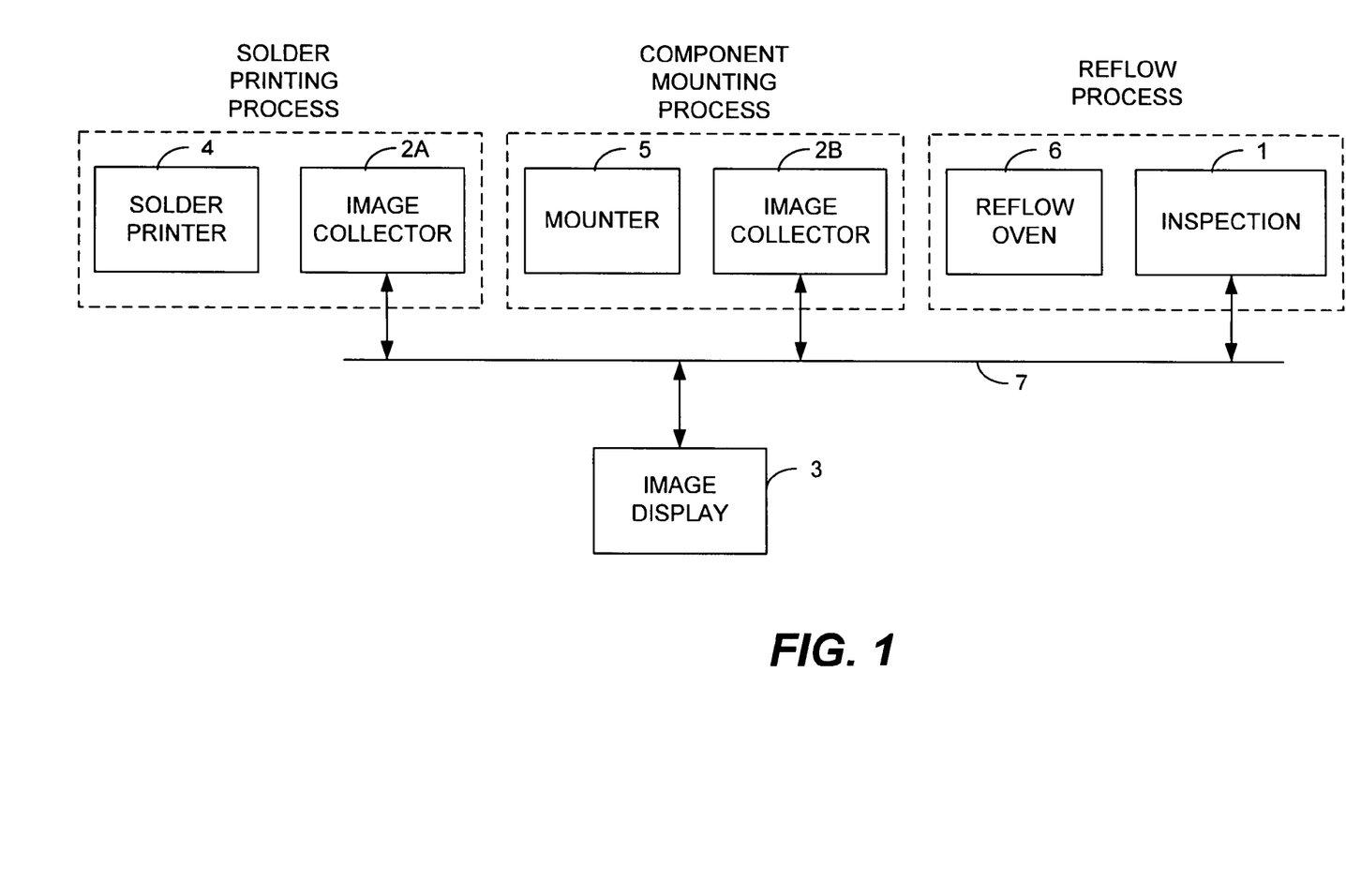
FIG. 1 is a structural diagram of a substrate production line incorporating a substrate inspection system embodying this invention.

FIG. 1 shows an example of substrate production line incorporating a substrate inspection system embodying this invention. This production line is comprised of three processes consisting of a solder printing process, a component mounting process and a reflow process, connected serially by a conveyer (not shown) for transporting substrates. The solder printing process is provided with a solder printer 4, the component mounting process is provided with a mounter 5, and the reflow process is provided with a reflow oven 6.

The reflow process is further provided with an inspection device 1 for inspecting the external view of the substrate taken out of the reflow oven 6, while the solder printing process and the component mounting process are each provided with an image collector 2A or 2B which has the function of generating an image of a substrate and saving the generated image but not the function of inspection. The image collectors 2A and 2B are respectively adapted to receive the substrate from the solder printer 4 or the mounter 5 and carry out image taking and image saving processes.

The inspection device 1 and the image collectors 2A and 2B are connected to a network line 7 such as a LAN line, to which is connected an image display device 3 which is for displaying the images generated by the inspection device 1 and the image collectors 2A and 2B and is comprised of a personal computer and a display device (not separately shown). The inspection device 1, the image collectors 2A and 2B and the image display device 3 may be said to together form the aforementioned substrate inspection system.

Figure 2:
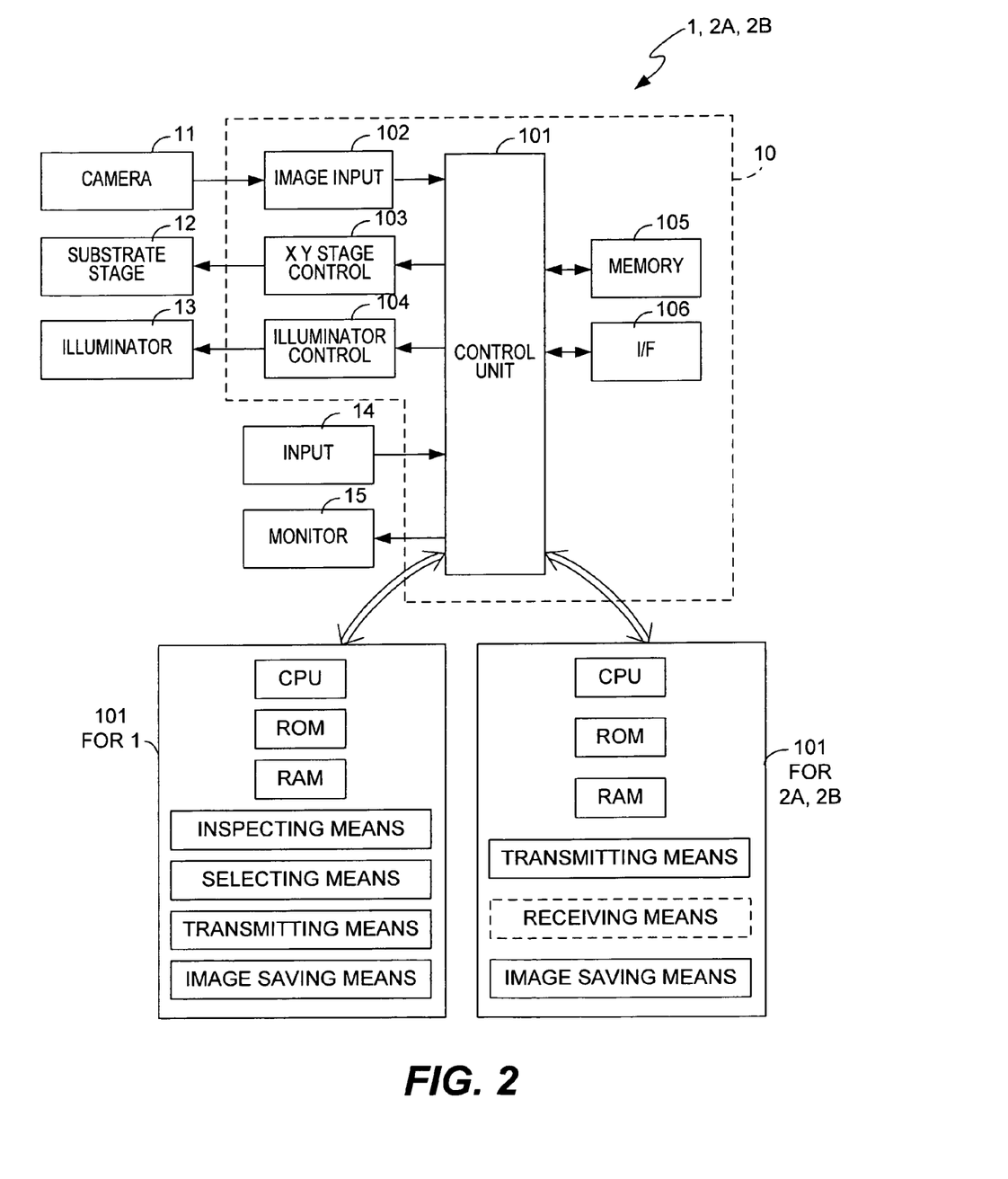
FIG. 2 is a block diagram for showing the structure of the inspection device and the image collectors.

FIG. 2 shows the structure which is common to the inspection device and the image collectors 2A and 2B, each being provided with a controller 10, a camera 11, a substrate stage 12, an illuminator 13, an input device 14 and a monitor 15. The controller 10 is provided with a control unit 101 with a computer, as well as an image input part 102, an XY stage control part 103, an illuminator control part 104, a memory 105 and a communication interface 106. The control unit 101 includes not only a CPU but also a ROM storing basic programs and a RAM serving as a work memory. A non-volatile memory such as a hard disk device is used as the memory 105. As schematically illustrated, the control unit 101 associated with the inspection device 1 further includes means for carrying out inspection processes, selecting portions of an image generated by the camera 11, transmitting various data and saving various image data. Similarly, the control unit 101 associated with the image controller 2A or 2B further includes means for transmitting and receiving various data and saving various image data.

The image input part 102 includes an interface circuit for inputting images and an A/D converter circuit and is provided between the camera 11 and the control unit 101. The XY stage control part 103 serves to move the substrate stage 12 according to a command from the control unit 101 such that the substrate will come inside the image-taking area of the camera 11. The illuminator 13 is for illuminating the substrate to be inspected, and the illuminator control part 104 serves to switch it on and off and to control the quantity of its light.

The input unit 14 is for inputting conditions of the inspection and the collection of images and comprises a keyboard and a mouse. The monitor 15 is used for displaying the image generated by the camera 11. The monitor 15 of the inspection device 1 may be used further for displaying the results of the inspection.

The memory 105 is used mainly for saving images. The memory 105 of the inspection device 1 is used also for storing programs necessary for the inspection and a component library where reference inspection data are set for each kind of component. For the image collectors 2A and 2B, all saved images are deleted after a specified time period. For the inspection device 1, on the other hand, all generated images are saved unless particularly specified otherwise. For this reason, a device with a larger memory capacity is used as the memory 105 for the inspection device 1.

The illuminator 13 of the inspection device 1 is formed such that red, green and blue light beams can irradiate the substrate at different angles of elevation. A large portion of the light projected on the fillet on the substrate is mirror-reflected. With the illuminator 13 thus structured, the color of the light received by the camera 11 varies according to the slope of the fillet. Thus, a different pattern of red, green and blue color distribution appears on the fillet on the image, reflecting the sloping condition of the fillet.

The illuminators 13 of the image collectors 2A and 2B are formed with a light source of an ordinary kind such as a white lamp. Because the kinds of memory and illuminator used for the inspection device 1 are thus different from those used for the image collectors 2A and 2B and because of the presence and absence of the inspection program and component library, the cost of the inspection device 1 is far greater than that of the image collectors 2A and 2B.

Each kind of substrate produced by this substrate production line is assigned an ID code referred to as the substrate code. Each component to be mounted to these substrates is also assigned an ID code referred to as the component code. For each kind of substrate to be processed, the memories 105 of the inspection device 1 and the image collectors 2A and 2B store data which correlate the component code of each kind of component that is mounted to that substrate and the setting conditions of the processing area for that component (such as the position and size of the area). They are common data among the inspection device 1 and the image collectors 2A and 2B and are in the form of a file (referred to as the component data file) for each type of substrate. The processing area means the area (extent) of the image to be processed at the time of inspection and process for cutting out image, and the setting conditions are determined such that all structural elements related to each component such as its main body, electrodes and lands will be included.

The inspection device 1 carries out inspection and process for cutting out image based on this component data file by setting a processing area on the target image of inspection for each component. The image collectors 2A and 2B also cut the image obtained by the camera 11 into processing areas and store in the memory 105. With all devices, the image of each processing area is edited in the image file with the component code corresponding to that area. Folders are set to the memory 105 for individual substrates and all image files generated for each substrate are stored in the corresponding folder. Each folder is assigned the substrate code of the corresponding substrate as its folder name (hereinafter referred to as the substrate code name). From the inspection device 1 or either of the image collector 2A and 2B, the image file corresponding to any specified component on a specified substrate can be easily called out by the substrate code and the file name.

With the image collectors 2A and 2B according to the illustrated example, an image is obtained every time a substrate is supplied and an image storing process is carried out as explained above. The image thus stored may be deleted after a specified period of time or after a specified number of images of substrates are stored. For components specified from the inspection device 1, however, their images are kept in the memory 105 even after the storage period.

The components thus specified from the inspection device 1 are those that have been judged to be OK as a result of inspection but have a high probability of thereafter being judged to be defective. According to the illustrated example, the inspection device carries out inspection of not only fillets but also displacements of components. A specified number of components are selected sequentially in order from those with measured displacements of components closest to a reference value defining a defect and these selected components are specified to the image collectors 2A and 2B. The specification of selected components is carried out by using their component codes. These component codes are transmitted not only to the image collectors 2A and 2B but also to the image display device 3.

The image display device 3 displays the component codes transmitted from the inspection device 1 and waits for the user's operation to specify components. As the specification operation is carried out, the component codes of the specified components are transmitted to the inspection device 1 and the image collectors 2A and 2B. As this transmission is received, the inspection device 1 and the image collectors 2A and 2B read out of the memory 105 the images of the components corresponding to these component codes and transmit them to the image display device 3. The image display device 3 displays these transmitted images together for each substrate.

Figure 3:
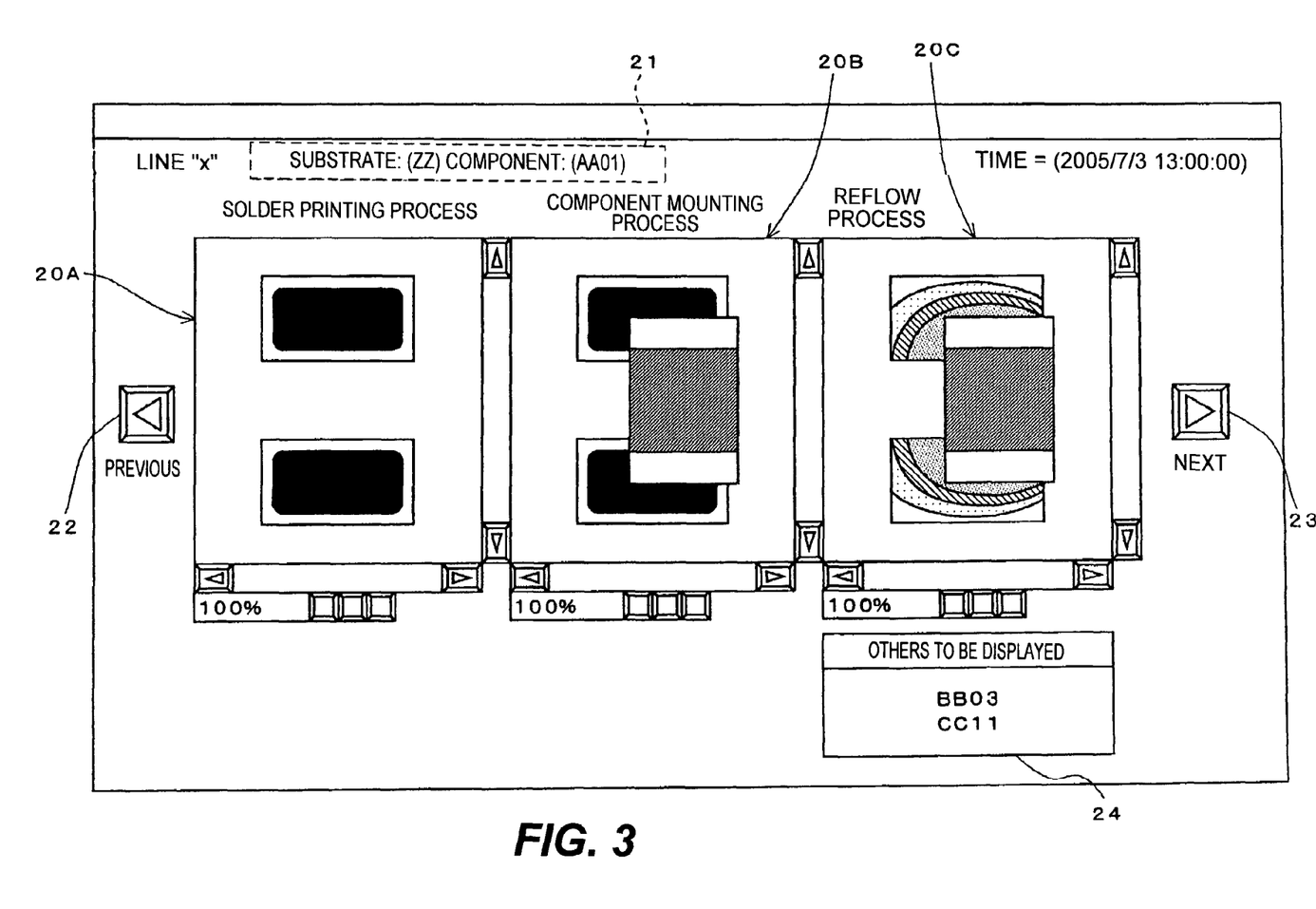
FIG. 3 shows an example of display made by the image display device

FIG. 3 shows an example of display thus made by the image display device. In this example, the display screen includes display windows 20A, 20B and 20C respectively for the solder printing process, the component mounting process and the reflow process, and the images from the image collectors 2A and 2B and the inspection device 1 respectively distributed to these processes are respectively displayed in these display windows. The images displayed in these windows 20A, 20B and 20C all relate to the same portion of the same substrate. Thus, changes made between the individual processes can be observed by comparing these displayed images.

The substrate code and the component code corresponding to the images displayed in these windows 20A, 20B and 20C are displayed inside a frame 21 on the upper edge part of the screen. A switch button 22 for switching to the image of the substrate which was previously processed is located on the left-hand side of the screen, and another switch button 23 for switching to the image of the substrate processed after the currently displayed substrate is located on the right-hand side of the screen. A window 24 for displaying the component codes of other components to be displayed is provided at a lower part of the screen. Hyperlinks are set to these codes in this window 24 such that display screen may be switched to the display of a desired component by clicking on its code.

With a display thus made, conditions of each component which has not exactly reached a point to be considered defective but has already undergone a positional displacement can be checked for each process and it can be ascertained in which of the processes its cause is to be found. FIG. 3 shows an example wherein a displacement of a component has already taken place, and it may be concluded therefrom that the cause of this displacement is in the mounter 5. If the images of a substrate which was measured for margin are sequentially examined, it can also be determined whether the displacement is gradually becoming larger or not.

Figure 4:
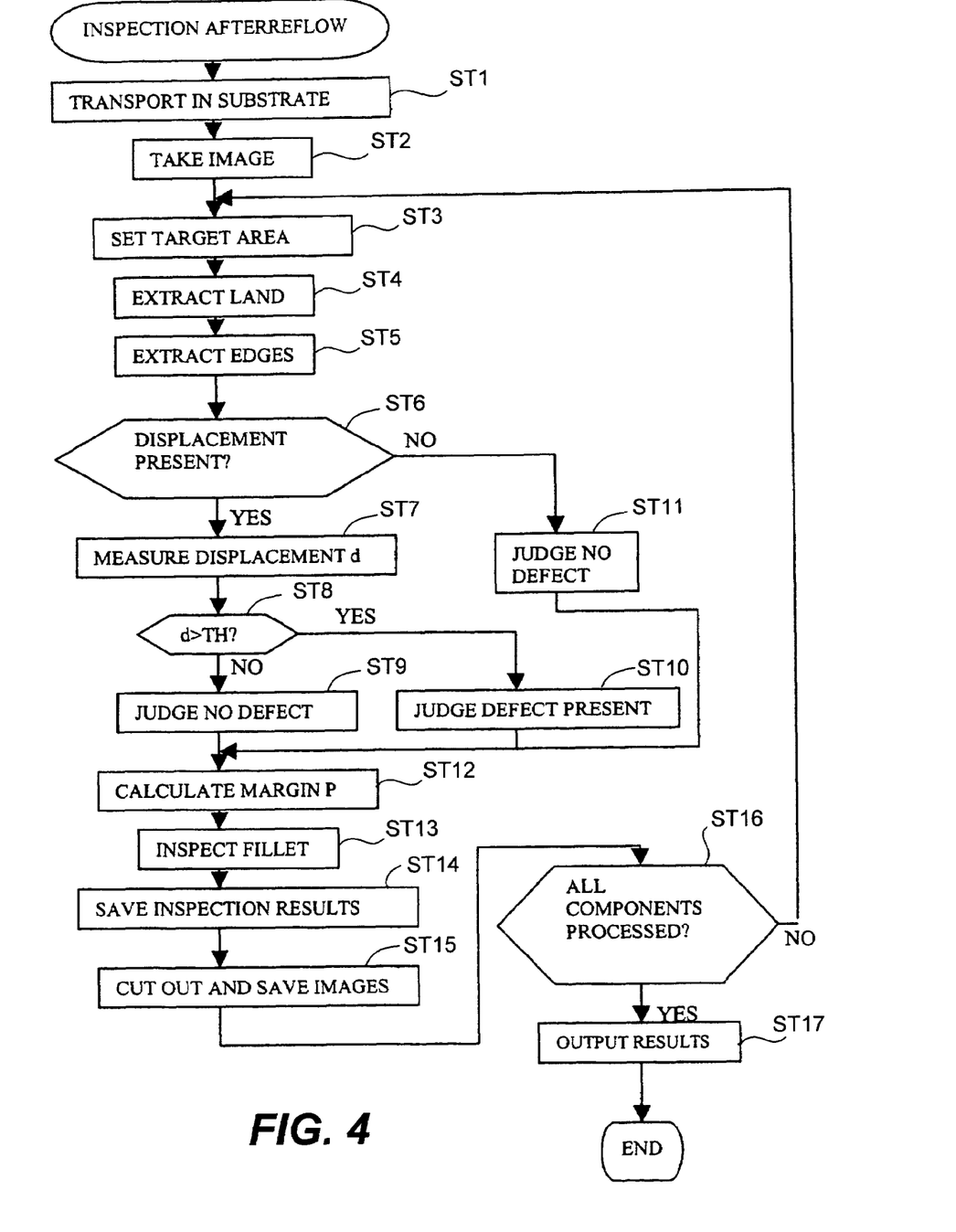
FIG. 4 is a flowchart of the inspection routine carried out by the inspection device.

The processes carried out by the inspection device 1 are explained in detail next with reference to FIG. 4 which shows a flowchart of the routine carried out by the inspection device 1. This routine is for one substrate and hence is repeated every time a new substrate is transported in.

After a substrate is transported onto the substrate stage 12 (Step ST1), its image is obtained by the camera 11 (Step ST2). The image data from the camera 11 are A/D converted by the image input part 102 and then temporarily stored in the RAM of the control unit 101.

Next, a target area for processing is set for a specified component on the substrate, based on the aforementioned component data file (Step ST3). Next, the image within this target area is binarized by the red, green and blue colors corresponding to the light source of the illuminator 13 and the color of the land, and the area of pixels showing any of these four colors is extracted as a land (Step ST4).

Next, a process for extracting edges of the component is carried out (Step ST5). Next, the results of Steps ST4 and ST5 are used to determine whether the component has undergone a displacement with respect to the land (Step ST6). If a displacement is judged to be present (YES in Step ST6), the quantity of the displacement d is measured (Step ST7).

Figures 5A, 5B, 6:
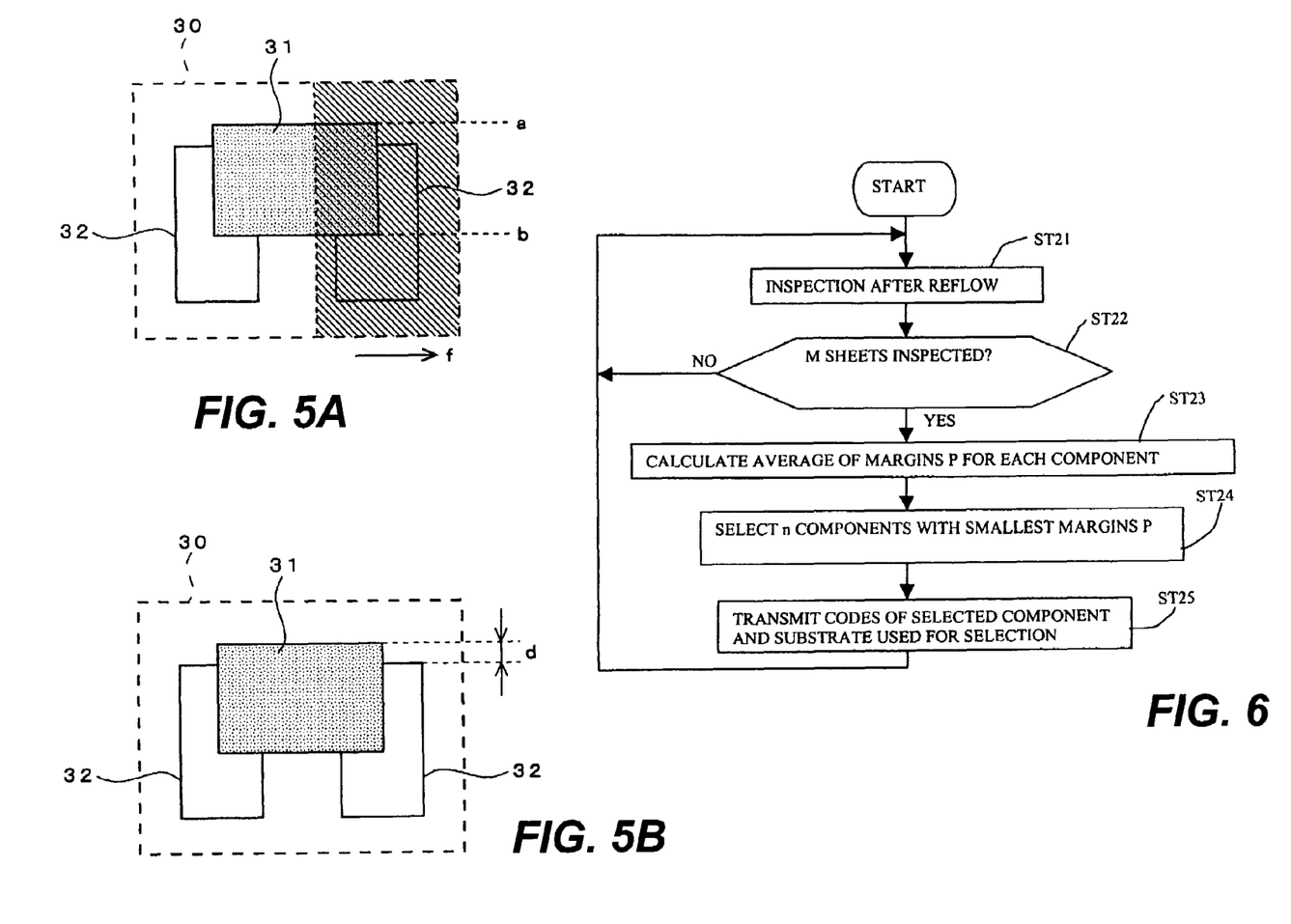
FIGS. 5A and 5B show an example of process for detecting a displacement.
FIG. 6 is a flowchart of the processing routine carried out by the inspection device.

FIGS. 5A and 5B illustrate an example of the processes carried out in Steps ST4 through ST7 on a chip component. Numeral 31 indicates the whole of the component, numerals 32 indicate the lands extracted in Step ST4, and numeral 30 indicates the aforementioned target area.

FIG. 5A is an example wherein the upper and lower edges of the component 31 are extracted for judging whether the component 31 is displaced in the up-down direction with respect to the land 32. In this process, after the image inside the target area 30 is binarized by the color of the component, an area portion from a position somewhat inside one of the lands 32 (on the right-hand side) to its outer side is considered and the image within this area portion is projected in the direction of the width (along arrow f). By this projection, the positions of the upper and lower edges of the component (shown respectively by dotted lines a and b) can be extracted.

In the illustrated example, it is judged that a displacement exists if either edge line of the component is outside the range of the width of the land and the displacement is measured. In the case of FIG. 5A, since the position of the upper edge (shown by line a) is outside the vertical range of the lands 32, the distance d shown in FIG. 5B is measured and presented as the displacement.

A similar process may be repeated also with the land on the left-hand side and the average of the measured quantities or the larger one may be treated as the displacement d.

The displacement in the direction perpendicular to arrow f is similarly obtained by projecting the image within the target area 30 in the perpendicular direction and extracting the left-hand and right-hand edges of the component 31. If either the left-hand or right-hand edge is outside the range of the lands 32 in the transverse direction, the distance between that edge and the land 32 may be obtained as the quantity of the displacement d.

With reference back to FIG. 4, after the displacement d is measured, this value is compared with a specified reference value TH. If the displacement d is greater than the reference value TH (YES in Step ST8), it is concluded that a defective displacement exists (Step ST10). If the displacement d is not greater than the reference value TH (NO in Step ST8), it is concluded that there is no defective displacement (Step ST9). If the edges extracted in Step ST5 are all within the width of the land (NO in Step ST6), it is also concluded that there is no defective displacement (Step ST11).

After a conclusion is thus made regarding the presence or absence of defective displacement, the margin P of the displacement value d with respect to the reference value TH is calculated (Step ST12). Basically, the absolute value of the difference between the displacement value d and the reference value TH is calculated as the margin P but if d<TH, or if it is not completely defective, the calculated value of the margin P is presented with a minus sign. If the positional displacement is not detected in Step ST6 and the judgment in Step ST11 is concluded, the margin P is set equal to the maximum value TH.

After the inspection of displacement of the component is thus completed, an inspection of fillet is carried out (Step ST13). This is done by measuring the sizes and positions of the red, green and blue areas on the lands 32 extracted in Step ST4 and comparing these measured values with specified reference values. If each measured value is within the reference value, the slope condition of the fillet is judged to be appropriate.

Next, the results of the inspection of displacement and fillet are stored in the RAM (Step ST14) and the image inside the aforementioned target area 30 (a color density image before the binarization) is cut out and stored in the memory 105 (Step ST15). This image which has been cut out is edited as an image file with the component code as its file name and stored inside a folder with the substrate code name.

Thereafter, each component on the substrate is sequentially set as the target. Displacement and fillet inspections are carried out, and the margin P with respect to the reference value TH is obtained for the displacement value. After such inspections are completed for all components (YES in Step ST16), the results of the inspections are outputted to an external apparatus (not shown) and the monitor 15 (Step ST17), and the inspection process ends.

The inspection device 1 carries out the routine described above every time a substrate is supplied. Every time a specified number of substrates have been inspected, a target component for analysis is selected from the margin P obtained for these substrates and its component code is transmitted to the image collectors 2A and 2B and the image display device 3. This series of steps is shown in FIG. 6.

After the routine explained above with reference to FIG. 4 (Step ST21) has been repeated for a specified number M of substrates (YES in Step ST22), an average value of margin P is calculated for each component code (Step ST23). Next, each component is sorted according to the margin and an n-number of components are sequentially selected from the one with the smallest margin (Step ST24). The component codes of the selected components and the substrate codes of the M substrates used for this selection are transmitted to the image collectors 2A and 2B and the image display device 3 (Step ST25).

Steps ST23-ST25 are repeated thereafter every time M substrates have been inspected. Thus, the component codes of components with small margin values are periodically transmitted to the image collectors 2A and 2B and the image display device 3.

Figure 7:
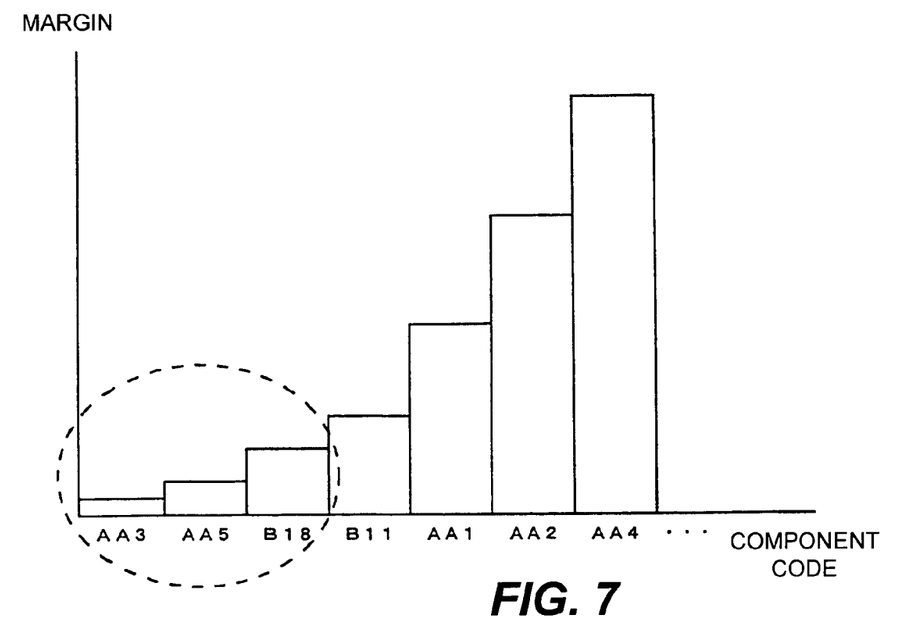
FIG. 7 shows an example of the method for selecting target components for analysis.

FIG. 7 shows an example where each component has been sorted sequentially from the one with the smallest margin. In this example, if it is set such that three components with smallest margin values are to be selected, components with codes AA3, AA5 and B18 are selected (indicated by a broken line).

It goes without saying, however, that it is not necessary to limit the number of components to be selected. If it is set so as to select all components with margin values less than a specified threshold value P0, as shown in FIG. 8, component B11 with the next smallest margin value is also selected.

Figure 8:
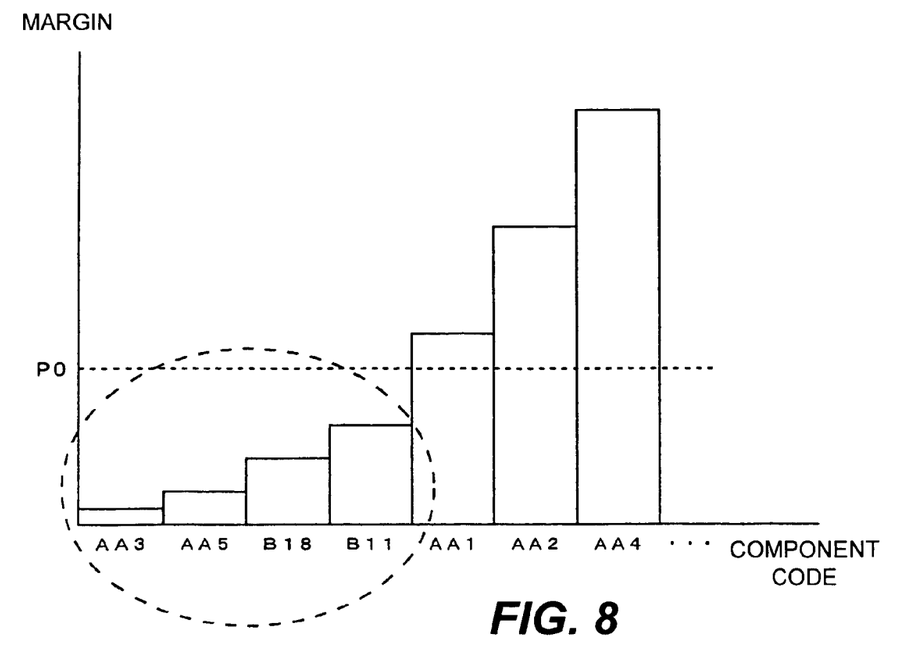
FIG. 8 shows another example of the method for selecting target components for analysis.

Components of the same types as those selected by the method of FIG. 7 or 8 may be additionally selected. This is because the mounter 5 has a high probability of mounting components of the same kind by using the same component pad and hence there is a similarly high probability for the occurrence of similar positional displacements.

Figure 9:
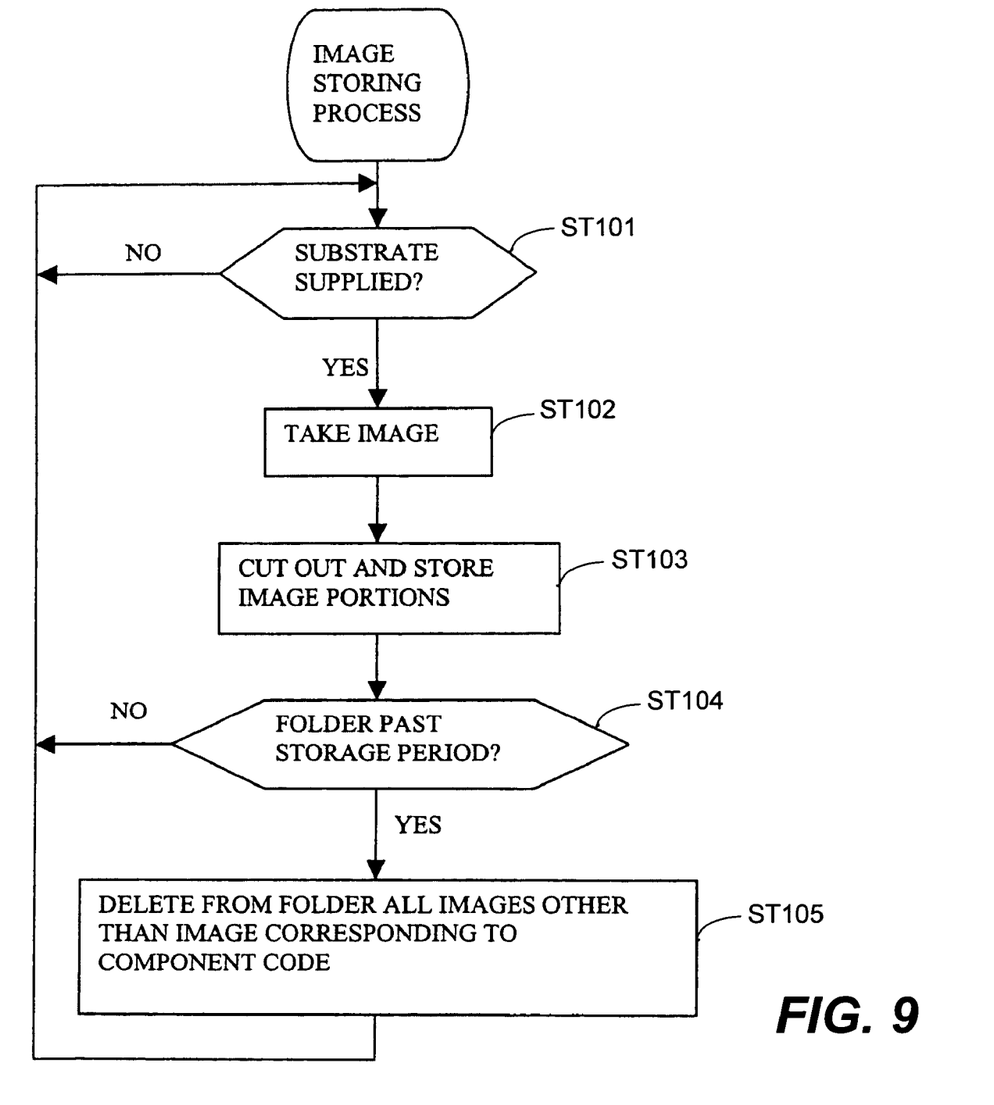
FIG. 9 is a flowchart of the processing routine carried out by the image collectors.

FIG. 9 shows the routine for the image storing process carried out by the image collectors 2A and 2B. In this routine, the image collectors 2A and 2B initially wait for a substrate to be supplied from the processing apparatus on the upstream side (either the solder printer 4 or the mounter 5) (Step ST101). When a substrate arrives (YES in Step ST101), its image is obtained by the camera 11 (Step ST102). Next, the aforementioned component data file is used to cut out target image portions from the image obtained in Step ST102 for each component and these image portions that are cut out are stored in the memory 105 (Step ST103). These image portions thus stored are also edited into the image file with the corresponding component code assigned thereto and stored in the folders with substrate code names.

The processes of Steps ST101-103 are thereafter repeated such that folders come to be set in the memory 105 individually for the substrates that are supplied, each folder storing the image portions cut out from the image of the substrate.

Although not shown in FIG. 9, if a component code and a substrate code are transmitted from the inspection device 1 at a certain point in time, these codes are stored in the RAM of the control unit 101. If a folder corresponding to a substrate which has passed a predetermined storage period is present in the memory 105 (YES in Step ST104), unnecessary images in such folder that has passed the storage period are deleted, that is, if the substrate code of the substrate corresponding to such a folder and the component code are transmitted from the inspection device 1, images other than that corresponding to this component code are deleted from this folder (Step ST105).

Every time a substrate is supplied, the processes of taking its image and storing such image are carried out and the process of Step S105 is carried out for files that passed their storage period. Thus, for every component selected by the inspection device 1 as having a small margin, images of M substrates used for the selection after the solder printing process and after the component mounting process come to be stored.

Although the image collectors 2A and 2B according to the example described above are adapted to erase all images other than those corresponding to the component code transmitted from the inspection device 1 after images of all target areas on the substrate are stored in the memory 105, this is not intended to limit the scope of the invention regarding the image storing process. For example, aside from the storage of images of all target areas for a specified period of time, images corresponding to the component code may be stored within a dedicated area in the memory 105 for a specified length of time. By a process of this kind, it becomes possible, after a measure is taken to eliminate the cause of displacement of a component for which the margin of displacement was judged to be small by the inspection device 1, to check the image of each process that was carried out thereafter and hence to easily determine whether the measure taken was appropriate or not.

Figure 10:
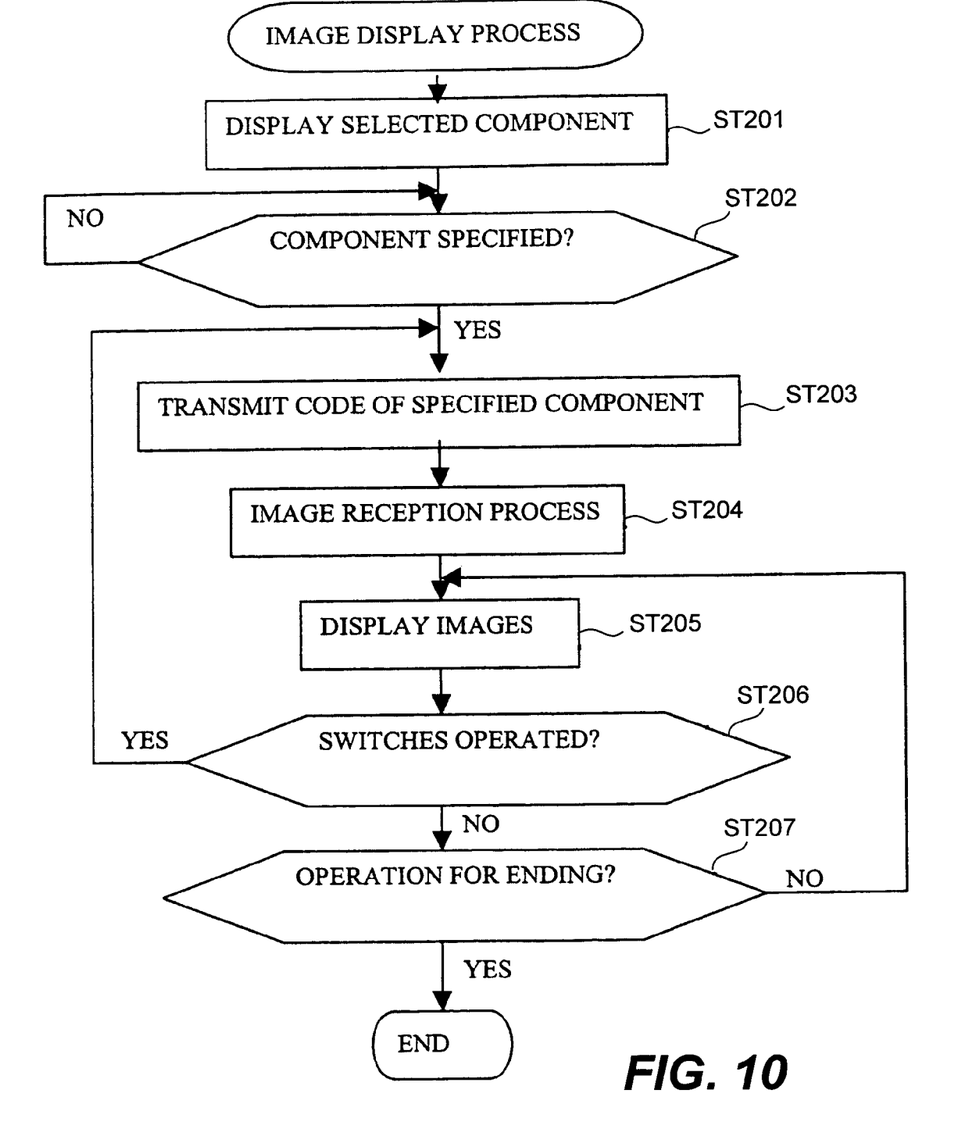
FIG. 10 is a flowchart of the processing routine carried out by the image display device.

FIG. 10 shows the routine for the image display process carried out by the image display device 3. This routine is started in response to the reception of a component code transmitted from the inspection device 1, the components selected by the inspection device 1 being displayed, based on the transmitted component codes (Step ST201). If the aforementioned component data file and CAD data of the substrate are stored in the image display device 3, a map image of the substrate may be displayed and the position and the name of the selected component can be shown on this map image.

If the user specifies a certain component out of the displayed components (YES in Step ST202), the component code of the specified component is transmitted to the inspection device 1 and the image collectors 2A and 2B (Step ST203). As the component code is received, the inspection device 1 and the image collectors 2A and 2B read out the image file corresponding to this code and transmit it to the image display device 3. The images transmitted from the inspection device 1 and the image collectors 2A and 2B are stored on a dedicated memory (such as the hard disk) of the image display device 3 (Step ST204).

As the received images are thus processed, a display screen as shown in FIG. 3 is set and an image corresponding to the specified component is displayed in the display windows 20A, 20B and 20C. These images thus displayed are all related to a specified single substrate. As either of the switches 22 and 23 is operated, the images in the display windows 20A, 20B and 20C are replaced with those of another specified substrate. The inspection device 1 and the image collectors 2A and 2B may transmit these images all at once, or may first transmit the image to be displayed and then transmit one image at a time whenever the switch 22 or 23 is operated in response to a signal from the image display device 3.

If the user specifies another component displayed in the window 24 (YES in Step ST206), the routine returns to Step ST203 and the component code of the newly specified component is transmitted to the inspection device 1 and the image collectors 2A and 2B, Steps ST204 and ST205 are repeated, and the display screen is updated.

Thereafter, images of the specified component corresponding to each production process are displayed for each substrate until an operation for ending is recognized (YES in Step ST207).

Although not shown in FIG. 10, if a defect is detected on a substrate by the inspection device 1, the image display device 3 may be adapted to receive images corresponding to the defective portion of such substrate from the inspection device 1 and the image collectors 2A and 2B and to display them similarly as shown in FIG. 3. Since the image collectors 2A and 2B are adapted to delete all stored images after a specified period except for those of components corresponding to component codes transmitted from the inspection device, displays as explained above can be made only while the corresponding images are still stored in the image collectors 2A and 2B.

Although the invention has been described above with reference to only a limited number of examples, they are not intended to limit the scope of the invention. Many modifications and variations are possible within the scope of this invention and such modifications and variations are intended to be within the scope of this invention. For example, although an example was shown above wherein margin is obtained only regarding positional displacements of components but margin may be obtained also regarding measured values obtained by the inspection of a fillet, and components that are likely to become defective in the solder printing process may be detected by a similar process as explained above. A defect may come about in the solder printing process due not only to the amount of the printed solder and the temperature at the time of the reflow process but also to the compressive force on the component at the time of the component mounting process. Thus, the user can easily determine which of the production processes was faulty if the image display device 3 is adapted to display the image of each selected component corresponding to each of the production processes.

What is claimed is:

1. A substrate inspection system comprising:
   an inspection device associated with one other than the first of a plurality of production processes that are carried out sequentially for producing substrates;
   an image collector associated with one of said production processes upstream to the production process with which said inspection device is associated and adapted to communicate with said inspection device; and
   an image display device for receiving images from said inspection device and said image collector and displaying said received images;
   wherein said inspection device comprises:
   image taking means for taking an image of a target substrate of inspection;
   inspecting means for using an image taken by said image taking means for each of target portions on said target substrate to carry out a specified measurement process and judging said each target portion by comparing a measured value obtained by said specified measurement process with a specified reference value;
   selecting means for obtaining, when a plurality of substrates of a same kind have been processed by said image taking means and said inspecting means, a margin of said measured value with respect to said specified reference value for each of said target portions for said plurality of substrates and selecting a target portion for analysis based on said margin; and
   transmitting means for transmitting identification data indicating said target portion for analysis selected by said selecting means to said image collector and to said image display device;
   wherein said image collector comprises:
   another image taking means for taking images of substrates after the production process with which said image collector is associated has been carried out thereon; and
   image saving means for extracting, in response to said identification data received from said inspection device, an image portion corresponding to the target portion indicated by said identification data out of the images generated by said another image taking means and saving said extracted image portion; and
   wherein said image display device serves to receive from said inspection device an image portion of said target portion selected as said target portion for analysis based on said identification data and generated when a specified substrate was being inspected, and to receive an image portion of a same target portion as the target portion of which an image was transmitted from said inspection device for said specified substrate and to display both said received image portions so as to be mutually compared.

2. The substrate inspection system of claim 1 wherein said plurality of production processes include a solder printing process, a component mounting process and a reflow process, said inspection device being associated with said reflow process and said at least one image collector being associated with said component mounting process; and
   wherein said inspecting means of said inspection device serves to inspect for each target component on a target substrate soldered condition thereof and displacement thereof with respect to a land; and
   wherein said selecting means calculates a margin of the displacement with respect to said reference value.

3. The substrate inspection system of claim 2 wherein said selecting means is adapted, if another component of the same kind as that selected as said target portion is mounted to said substrate, to also select said another component as a target of analysis.

* * * * *